United States Patent [19]

Miller

[11] Patent Number: 5,280,987
[45] Date of Patent: Jan. 25, 1994

[54] IN-FLOOR SEAT ADJUSTER

[75] Inventor: Harold J. Miller, Mt. Clemens, Mich.

[73] Assignee: General Motors Corporation, Detroit, Mich.

[21] Appl. No.: 29,214

[22] Filed: Mar. 10, 1993

[51] Int. Cl.$^5$ .............................................. B60N 1/08
[52] U.S. Cl. ................... 296/65.1; 248/429; 248/430; 297/311
[58] Field of Search ............... 296/65.1; 248/429, 430; 297/311, 331

[56] References Cited

U.S. PATENT DOCUMENTS

| | | | |
|---|---|---|---|
| 1,306,498 | 6/1919 | Moses | 296/65.1 |
| 1,716,316 | 6/1929 | Lanning | 296/65.1 |
| 3,476,435 | 11/1969 | Hitzelberger | 296/65 |
| 4,601,517 | 7/1986 | Heesch | 297/452 |
| 4,700,989 | 10/1987 | Ercilla | 297/331 |
| 4,773,693 | 9/1988 | Premji et al. | 296/65.1 |
| 4,779,917 | 10/1988 | Campbell et al. | 296/65.1 |
| 4,949,931 | 8/1990 | Fujiwara et al. | 248/429 |
| 5,011,209 | 4/1991 | Takarabe et al. | 296/65.1 |
| 5,104,176 | 4/1992 | Mrozowski | 296/187 |
| 5,106,144 | 4/1992 | Hayakawa et al. | 296/68.1 |

Primary Examiner—Robert R. Song
Attorney, Agent, or Firm—Ernest E. Helms

[57] ABSTRACT

A dual rail adjuster arrangement is provided that is hidden beneath the floor. The adjuster can be used for front or rear seat applications and offers the necessary strength and stability that prior wheeled adjusters cannot. In addition, the present invention offers the ability to remove the seat so that a van cargo area can be cleared in a relatively simple manner. The adjuster arrangement is non-obtrusive, and the floor is left relatively flat when the seats are removed. In a preferred embodiment, the adjuster includes an elongate stationary rail that is substantially recessed below the vehicle floor. The rail is positioned into a formation in the floor or, if additional strength is necessary, into a reinforcement that extends below the floor. A slider rail is fitted at the stationary rail and is supported by roller ball bearings or other similar means interposed between the two rails. The slider rail is substantially shorter than the stationary rail, the resulting difference in length being the total amount of available adjustment of the slider rail. The seal is connected with the slider rail whose position can be adjusted.

19 Claims, 3 Drawing Sheets

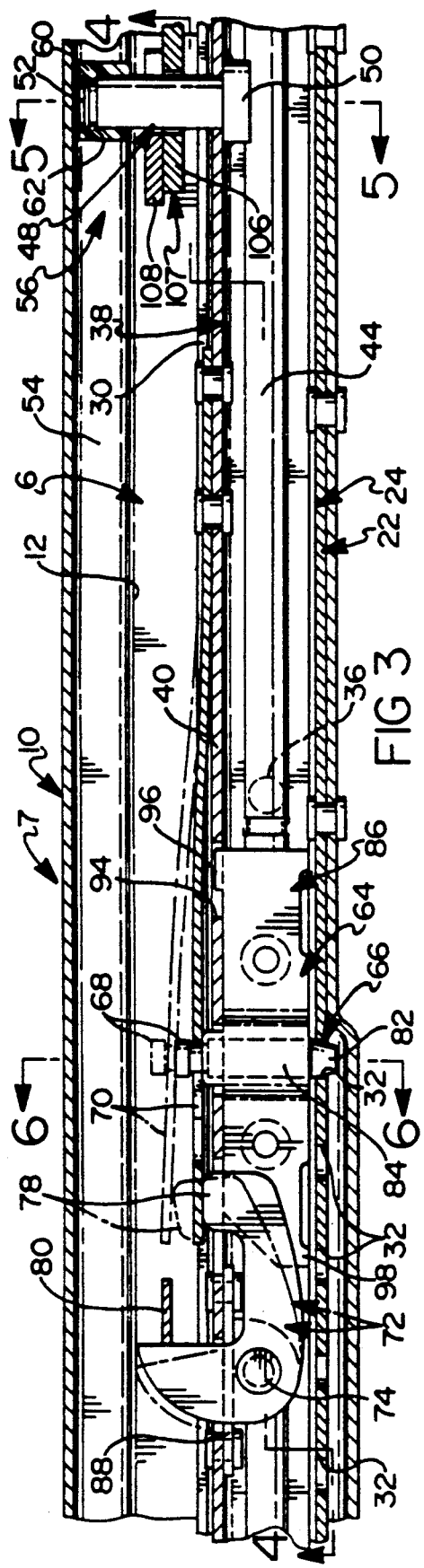

IN-FLOOR SEAT ADJUSTER

BACKGROUND OF THE INVENTION

The present invention generally pertains to a horizontal adjuster for a vehicle seat and especially to an adjuster for removable seats that is hidden beneath the vehicle floor.

Removable rear seating arrangements have long been the standard in multipurpose passenger vehicles and particularly in vans and minivans. The seats are removable to take full advantage of the potential cargo area inherent in these vehicles. Such an option offers improved cargo space but is difficult to implement because of the weight and bulk of the seats.

Other rear seats that fold up or stow within the vehicle have also been introduced. These reconfigurable seats improve storage flexibility by incrementally increasing the cargo area with only a minimum of effort. Many also retain the removability feature to allow the option of maximizing the cargo area.

Still other reconfigurable rear seats have been provided with longitudinal adjuster assemblies as an alternative way to further increase cargo area without removing the seats. For example, U.S. Pat. Nos. 4,779,917 and 4,949,931 both teach of rear seats for a van that are adjustable and reconfigurable. Their adjuster systems are hidden below the floor and comprise wheeled trucks rolling in a track. These arrangements, however, lack or are deficient in certain desirable characteristics. In both, the seats do not appear to be removable from their roller tracks. By their nature, such wheeled systems are unstable and promote undesirable vibrations because clearances are needed around their wheels for them to roll freely. Also, such seats are generally not as secure during a crash.

In addition to offering flexible rear seating, it is also desirable for multipurpose vehicle to have a flat cargo area for easy and efficient use thereof. Therefore, it is a requirement that any rear seat mounting or adjuster system not be exposed above the vehicle floor so that when the seats are adjusted forward or removed, the floor will be relatively smooth and level. U.S. Pat. No. 5,104,176 shows a construction with a roller track that has the same disadvantages as the roller adjusters noted above. A dual rail adjuster positioned below the vehicle floor is shown in U.S. Pat. No. 5,011,209. Since this is a dual rail adjuster, the problems commonly associated with wheeled adjusters are avoided. However, this adjuster does not accomodate the requirements of a removable seat because its locking and seat attachment means are conspicuously located above the floor.

SUMMARY OF THE INVENTION

In contrast, the present invention broadly teaches of a reconfigurable seat that is both longitudinally adjustable and removable. To accomplish adjustment, the present invention uses a dual rail adjuster arrangement that is hidden beneath the floor. This type of adjuster is widely accepted for front seat applications and offers the necessary strength and stability that wheeled adjusters cannot. In addition, the present invention offers the ability to remove the adjustable seats in the same way as the stationary seats are removed. This feature allows the cargo area to be cleared in a relatively simple manner. The result is that, because the adjuster arrangement is non-obtrusive, the floor is left relatively flat when the seats are removed.

The present invention comprises an elongate stationary rail that is substantially recessed below the vehicle floor. The rail is positioned into a formation in the floor or, if additional strength is necessary, into a reinforcement that extends below the floor. A slider rail is fitted at the stationary rail and is supported by roller ball bearings or other similar means interposed between the two rails. The slider rail is substantially shorter than the stationary rail, the resulting difference in length being the total amount of available adjustment of the slider rail.

Seat attachment means are also provided with the present invention. Since it is desirable to have a flat surface for the cargo area when the seats are removed, the seat attachment means are accessibly located below the vehicle floor. In the preferred embodiment, rods are secured to the slider rail and extend laterally from it such that they can be accessed through the floor formation. A seat having traditional releasable mounting latches is mounted onto the rods. With this arrangement, the seat is securely and safely held, removable and adjustable with the moving slider rail.

As with the seat attachment means, it is important that the locking arrangement is non-obtrusive upon removal of the seat. To accomplish this, the present invention separates the locking arrangement into independent but cooperating locking means and actuator means. The adjuster locking means is hidden under the floor between the sliding and stationary rails. The locking means, in addition to securing the position of the seat, prevents any undesired sliding of the rail when the seat is not in the vehicle so that the rails are aligned for easy reinstallation of the seat. The actuation means is conveniently located on the seat and is removable therewith. The arrangement is coordinated such that when the seat is mounted, the actuation means is able to cooperate with the lock means.

A secondary locking means, also non-obtrusive, is also included in the preferred embodiment. The secondary locking means is a passive lock designed only for use during periods of extreme loading conditions like, for example, a crash. The secondary locking means is engageable only upon an initial deformation of the primary locking means and, therefore, does not interfere with the normal adjustability of the seat.

The present invention can be used with bench seats or individual bucket seats as desired, but each seat needs a pair of the hidden adjusters. The adjusters must be parallel and spaced apart approximately the width of the seat to accept the latches of each leg. The seats are preferably supported by four legs, each leg having its own latching and release means. Although not necessary, to increase storage flexibility the seat can be capable, upon release of its rear legs, of being pivoted about its front legs and stowed in a vertical orientation.

A preferred vehicle configuration includes three rows of bucket seats. The forward row of seats is used for vehicle operation and is adjustable but cannot be removed from the vehicle. Passenger seats in the middle row are not adjustable, but they can be removed or reconfigured to a vertical stowage position. The rearmost seats are similar to those in the middle row except that each is mounted on the present invention and comprises lock actuation means. As a result of being mounted on the present invention, the rearmost seats can be adjusted longitudinally. Typically, a small cargo area is available between the last row of seats and the rear door of the vehicle.

With the above configuration, a multitude of rear compartment seating and cargo arrangements are available. The rearmost seats can be slid forward to incrementally increase the cargo area without losing seating capacity, or they can be moved back to accommodate long-legged passengers sitting therein. The cargo area can be increased if the last row of seats is stowed or removed. Another important configuration has the middle row stowed and the last row slid forward and stowed, thereby providing the largest cargo area without having to remove any seats from the vehicle. Finally, because the rearmost adjustable seats can be removed as easily as the middle stationary seats, the cargo area can be maximized with little effort. Other arrangements are possible but their significance depends on the needs of individual users.

Accordingly, in furtherance of increased utility for multipurpose vehicles, it is a primary object of the present invention to offer a hidden adjuster for a rear seating arrangement. Another object of the invention is to increase cargo space flexibility. Yet another object is to improve the stability and strength of a hidden seat adjuster. Still another object is to provide non-obtrusive locking means for a hidden adjuster. An additional object of the invention is to provide adjustable, non-obtrusive means for mounting a removable vehicle seat. Still another object of the present invention is to provide a seat as above described which additionally allows the seat belt restrain to be directly attached with the seat.

These and other objects and advantages of the present invention will be apparent from the detailed description of a preferred embodiment thereof when considered in conjunction with the accompanying drawings.

BRIEF DESCRIPTION OF THE DRAWINGS

In the accompanying drawings, wherein reference numbers are consistent throughout the several views:

FIG. 3 shows an enlarged partial section of the slider rail environment taken along line 3—3 of FIG. 1;

FIG. 4 is a fragmented sectional view of the slider rail environment taken along line 4—4 of FIG. 3;

DETAILED DESCRIPTION OF A PREFERRED EMBODIMENT

Referring to the accompanying drawings, there is shown a dual rail adjuster arrangement 7 that is substantially hidden below the vehicle floor and can accommodate removable and stowable seats 2.

Figure 1:
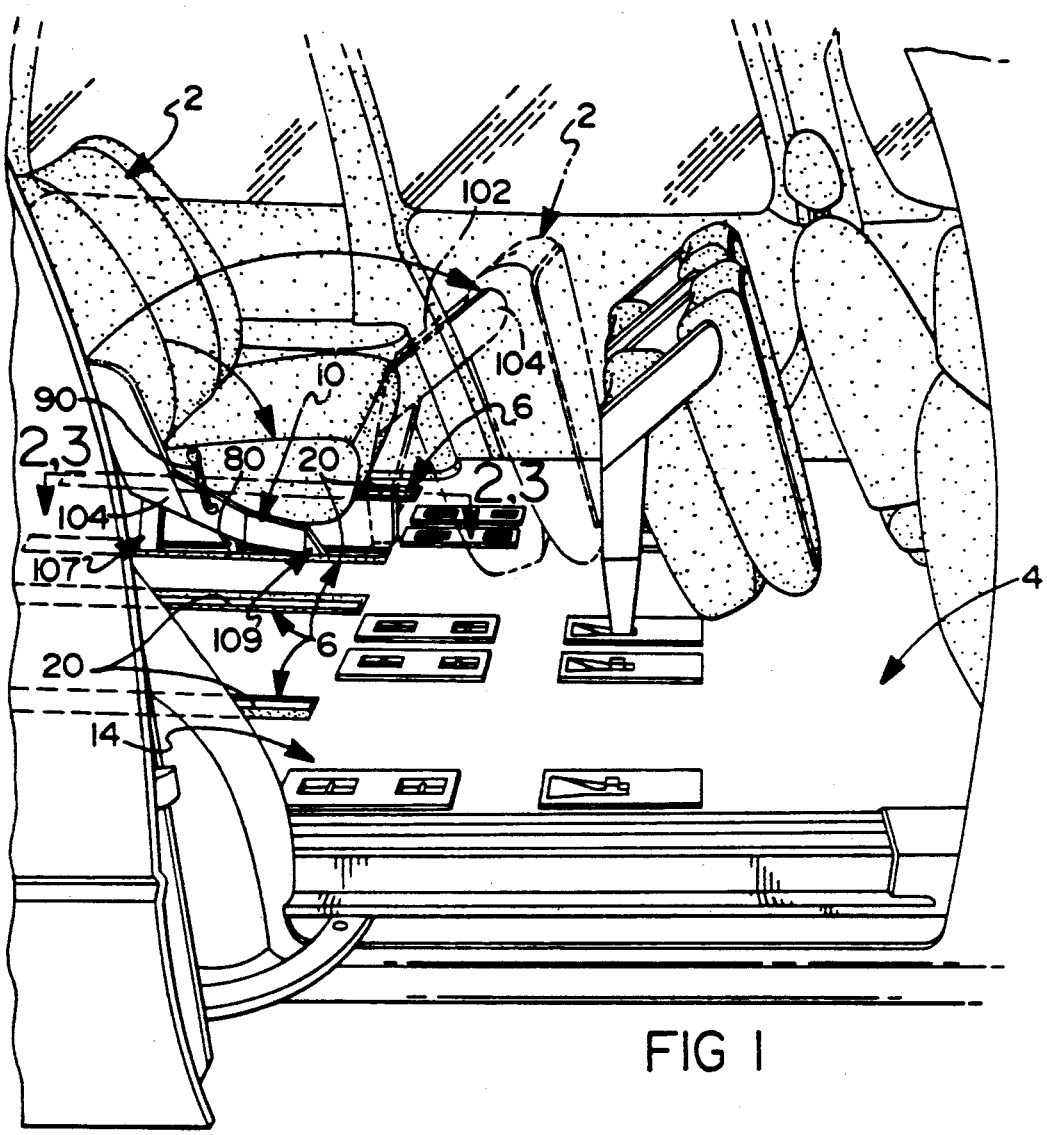
FIG. 1 is a perspective view from the side of a vehicle that comprises the present invention.
Figure 2:
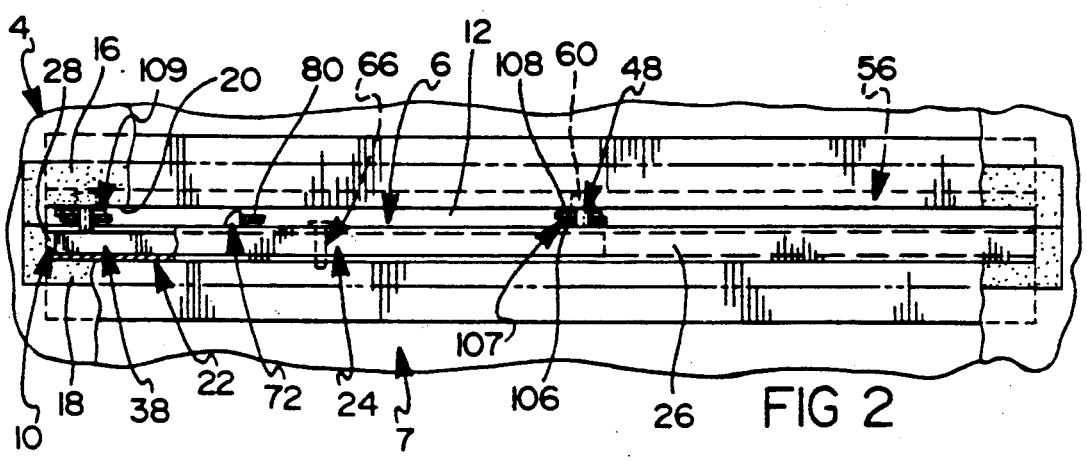
FIG. 2 is a fragmented schematic view of the present invention in a section taken along line 2—2 of FIG. 1.
Figure 5:
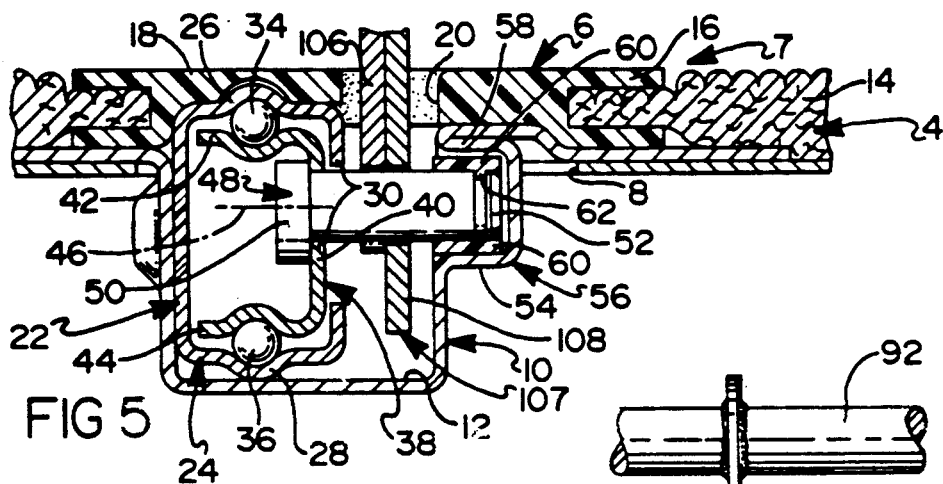
FIG. 5 shows the seat mounting rod in an enlarged cross sectional view taken along line 5—5 of FIG. 3.

The vehicle floor 4 has four formations 6. Each formation has an elongated aperture of slot 8. (Note in FIGS. 2-4, the front of the vehicle is shown to the left.) Within slot 8 is a placed a reinforcement member 10 having a recess 12 which extends below the level of the vehicle floor 4. The vehicle floor also has carpeting 14 which has its free ends encased by two plastic riser pieces 16 and 18. The plastic riser pieces 16 and 18 partially cover the slot 8. The plastic riser pieces 16 and 18 also have a slotted aperture 20 therebetween to allow for access to the recess 12 of the reinforcement member 10.

Affixed to the reinforcement member 10 and having a position fixed with respect to the vehicle is a first elongated stationary first rail 24. The first rail 24 has a channel portion 22, an upper flange 26 and a lower flange 28. The upper and lower flanges 26/28 each have a corresponding lip 30. As best shown in FIG. 3, the channel portion 22 of the first rail has a series of geometrically spaced apertures 32 allowing for the channel portion 22 of the first rail member to supply a locking plate means in a manner to be described later.

Slidably mounted by a plurality of upper ball bearings 34 and lower ball bearings 36 on the first rail 24 is a second slider rail 38. The second rail 38 is shorter than the first rail 24. The second rail 38 has a channel portion 40 joined with upper and lower flanges 42 and 44. The flanges 42 and 44 are interlocked with the flanges 26 and 28 for two reasons. The first reason is that by the interlocking design and also by virtue of all bearings 34 and 36 placing the second rail 38 in compression, chucking is eliminated. (Chucking is the slight rocking or movement of the seat caused by loading of the seat.) Additionally, interlocking the flanges causes a structural condition wherein the second rail 38 cannot be vertically displaced with respect to the first rail 24 without the flange 42 deforming the flange 26.

Fixably connected with the second rail 38 along a fixed locational axis 46 is a mounting pin 48. The mounting pin 48 has a first end 50 which is fixably connected with the second channel 38 and a second end 52 which is encircled by an elastomeric roller 60. Elastomeric roller 60 is captured to the mounting pin 48 by virtue of a ring 62 which is entrapped by a corresponding groove in the mounting pin 48. The mounting pin 48, in a manner to be later described, provides a means to hold a removable vehicle seat and to secure the seat to the second rail 38 during the adjustment of the seat location.

The second end 52 of the mounting pin 48 is supported and vertically entrapped by a third rail means 56. The third rail 56 is formed out of the reinforcement 10 having a lower surface 54 and a top surface provided by a flanged end 58. The third rail is parallel with the first rail 24 and is spaced therefrom. The third rail provides two major functions. The first function of the third rail is to support the second end 52 of the pin member 48. Additionally, the third rail 56 prevents the second end of the pin from moving vertically upward, especially during a crash situation. Therefore, if an excessive load is placed upon the mounting pin 48 seeking to dislodge it upwardly, such movement of the pin 48 will be prevented by the third rail upper flange 58, along with the upper flange 26 of the first rail. Therefore, the mounting pin 48 will tend to remain in its proper horizontally extending orientation, even during excessive loading.

Figure 6:
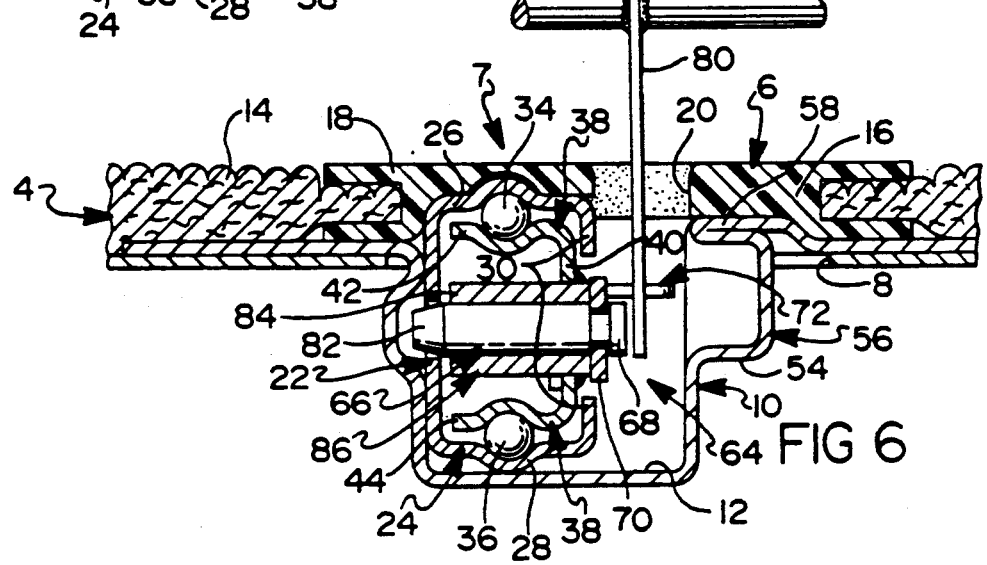
FIG. 6 shows the locking arrangement in an enlarged cross sectional view taken along line 6—6 of FIG. 3.

Referring in particular to FIGS. 3, 4 and 6, the locking means 64 of the adjuster arrangement 7 is shown in detail. At the heart of the locking means is a pin 66. The pin 66 has a conical end 82 and a head 68. The pin is slidably held in a bushing 86 which is fabricated from two elongated plate members with a formed eyelet 84. The pin 66 conical end 82 can be selectively inserted into one of the slots 32 to set the position of the second rail 38 with respect to the first rail 24, thereby determining the fore and aft position from the seat. To hold the pin in the appropriate adjusted setting, there is provided a leaf spring 70 which captures a head 68 of the pin 66 and biases the pin 66 into an engaged position. To allow for adjustment of the seat 2, the position of the second rail 38 must be adjusted with respect to the first rail 24. To accomplish the above-noted task, there is a bell crank 72 which is rotatably connected with the second rail 38 by a pivot pin 74 supported on a stand 88 which is in turn fixably connected with the second rail 38 channel portion 40. The bell crank has an impact end 78 which contacts the leaf spring 70 to remove the pin 66 from engagement to allow for adjustment of the seat. An actuator bar 80 is pivotally mounted with the seat 2 and can be actuated by a pull-on handle 90 to provide actuation of the locking means 64 from a remote location adjacent the side of the vehicle seat 2. In most applications, longitudinal formation 5 will have identical corresponding slide arrangement 7 with corresponding locking mechanism 64. Therefore, underneath the seat 2 will be a cross bar 92 connected with the end of the handle 90 which actuates a corresponding locking means 64 for the other adjuster arrangement.

The adjuster arrangement 7 of the present invention also has a secondary locking feature provided by the bushing plate 86. The bushing plate 86 is connected with the channel portion 40 of the second rail by a slight peening radially outward in an aperture 94 in the channel portion 40 of the second rail. In a crash situation, the force exerted by the seat 2 (which is mounted on the mounting pins 48) is greater than that which the locking mechanism can usually be expected to withstand. The impact (or contact) of the conical head 82 of the locking pin will cause the locking pin 66 to attempt to rotate as shown in FIG. 3 in a counterclockwise rotation, causing a bushing edge 96 to break out into the aperture 94 and for a bushing fingered end 98 to be rotated into one of the slots 32. This movement of the bushing 64 will then freeze the relative position of the second rail member 38 with respect to the first rail member to such a large magnitude that the seat belts may safely be attached to the seat 2 instead of being anchored to the vehicle.

The seat 2 has left and right frame members 102 and 104 which have ends substantially identical having clasping fingers 106 and 108 which grip the four mounting pins 48 (two for each adjuster arrangement 7) to mount the seat 2 with the second channel 38. The leg assemblies are often referred to in the industry as seat risers. In a method known in the art, a releasing mechanism connected with the seat allows the risers to release the seat 2 from the mounting pins. In a preferred embodiment a shown in FIG. 4, the rear leg 107 will be released first, allowing the seat back to then be folded over on the seat bun and then the whole seat to be pivoted forward on a forward riser 109 to extend the cargo space without removal of the seat. In instances where total removal of the seat is desired, the seat riser 109 will also be released from its corresponding mounting pin 48. The seat 2 can then be removed from the vehicle. When the seat is removed, plastic risers 16 and 18 will act as pellet slides. Another additional advantage of the present invention is that seat 2 can be made to be a bench seat with risers entering into the two outboard formations 6. Again, adjuster arrangement 7 provides such strength that the seat belts may be directly attached to the vehicle seat instead of to the vehicle frame or floor, as required in most vehicles.

Figure 7:
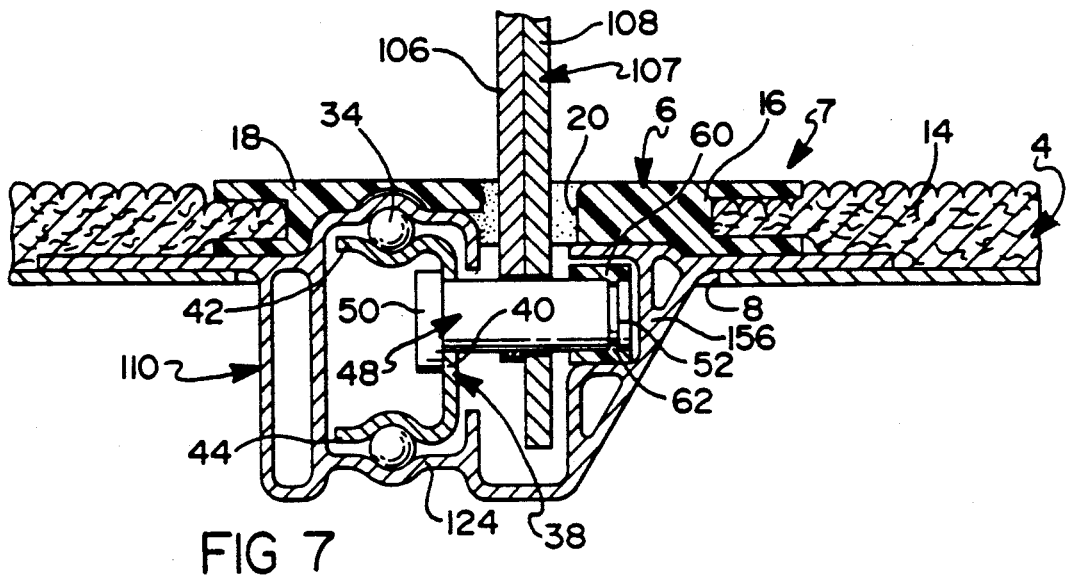
FIG. 7 is an enlarged cross sectional view similar to FIG. 5 but showing another embodiment of the present invention.

Referring to FIG. 7, an embodiment of the present invention is shown wherein the reinforcement 110 and first rail 124, along with the third rail 156, are formed from a common aluminum extrusion to help meet the environmentally mandated goal of reduction of vehicle weight.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A horizontal adjuster arrangement for a removable vehicle seat, said arrangement being located substantially below the floor of the vehicle and comprising:
   a longitudinal formation in the vehicle floor;
   an elongate stationary rail secured at the formation;
   a slider rail interconnected with but shorter than the stationary rail, the slider rail being carried by means that facilitate relative motion between the two rails;
   locking means to selectively secure the slider rail at a plurality of predetermined positions; and
   mounting means to hold a removable seat, the means being cooperatively secured to the slider rail for motion therewith.

2. An adjuster arrangement as defined in claim 1 further comprising an elongate reinforcement affixed at said formation, said reinforcement extending below the floor.

3. An adjuster arrangement as defined in claim 2 further comprising independent lock actuation means secured to the removable seat, said actuation means cooperating with the slider locking means to selectively adjust the seat position.

4. A horizontal adjuster arrangement for a removable vehicle seat, said arrangement being substantially hidden below the floor of the vehicle and comprising:
   a longitudinal formation in said floor;
   a reinforcement secured at the formation, said reinforcement having a recess extending below the vehicle floor;
   an elongate stationary rail in said recess and affixed to the reinforcement;
   a slider rail interconnected with but shorter than the stationary rail, said slider rail being carried by a plurality of rolling bearings interposed between said rails;
   locking means to selectively position the slider rail at a plurality of predetermined positions; and
   a plurality of seat mounting pins cooperatively secured to said slider rail, the mounting pins being unobstructed and accessible from above.

5. An adjuster arrangement as defined in claim 4 wherein said locking means comprises:
   a plurality of evenly spaced openings in said stationary rail;
   a lock pull spring secured to said slider rail;
   a locking pin secured to the lock pull spring, said locking pin releasably engaged in said openings; and
   pivotal cam means cooperating with said lock pull spring to selectively disengage the lock pin from said openings.

6. An adjuster arrangement as defined in claim 5 further comprising independent lock actuation means secured to the removable seat, said actuation means cooperating with the slider locking means to selectively allow adjustment of the seat position.

7. An adjuster arrangement as defined in claim 4 wherein said mounting pins extend laterally from said slider rail.

8. An arrangement for a stowable and removable vehicle seat, wherein said arrangement has a horizontal seat adjuster that is substantially hidden below the floor of the vehicle, said arrangement comprising:
- a longitudinally oriented slot in said floor;
- a reinforcement secured in said slot and extending below the vehicle floor, said reinforcement comprising a vertical side with a lengthwise channel running thereon;
- an elongate stationary rail affixed to said reinforcement;
- a slider rail interconnected with but shorter than the stationary rail, said slider rail being carried by a plurality of rolling bearings interposed between said rails;
- locking means to selectively position the slider rail at a plurality of predetermined positions, said positioning thereby adjusting the horizontal location of said seat unit;
- a plurality of seat mounting pins cooperatively secured to and extending laterally from said slider rail, said pins accessible from above with each rod having roller means on its unsecured end, said roller means being supported by the lengthwise channel of said reinforcement; and
- a vehicle seat, said seat having front and rear legs, front and rear releasable locking means for cooperatively securing said legs on said mounting rods, and whereby said seat, upon release of the rear leg locking means, can be reconfigured about its front legs to a vertical stowage position.

9. A seat arrangement as defined in claim 8 wherein said seat further comprises independent lock actuation means secured to the removable seat, said actuation means cooperating with the slider locking means to selectively allow adjustment of the seat position.

10. A seat arrangement as defined in claim 8 wherein said slider locking means comprises:
- a plurality of evenly spaced openings in said stationary rail;
- a lock pull spring secured to said slider rail;
- a locking pin secured to the lock pull spring, said locking pin releasably engaged in said openings;
- sleeve means to align the locking pin, said sleeve being secured to the slider rail; and
- pivotal cam means cooperating with the lock pull spring to selectively disengage the lock pin from said openings.

11. A seat arrangement as defined in claim 10 wherein said sleeve means further comprises a second locking means, said second means cooperating with the locking pin to engage the stationary rail openings only during extreme loading conditions.

12. A seat arrangement as defined in claim 8 wherein said reinforcement and said stationary rail are integrated into one continuously formed unit.

13. A fore and aft adjuster arrangement for a vehicle seat, the arrangement comprising:
- a first rail means oriented in a fore and aft direction generally fixed with respect to the vehicle, having at least one flange;
- a second rail means slidably mounted with respect to the first rail means, having at least one flange interconnected with the flange of the first rail means;
- a mounting pin with first and second ends, the first end of the mounting pin projecting from the second rail along a locationally fixed axis, the mounting pin providing means for mounting of a vehicle seat; and
- a third rail means fixed with respect to the vehicle generally parallel and spaced from the first rail means, the first rail means supporting the second end of the mounting pin for relative movement of the mounting pin with respect to the third rail means.

14. A fore and aft adjuster arrangement as described in claim 13 wherein the third rail means vertically entraps the second end of the mounting pin.

15. A fore and aft adjuster arrangement as described in claim 13 further including locking means to selectively secure the second rail means at a plurality of predetermined positions with respect to the first rail means.

16. A fore and aft adjuster arrangement as described in claim 13 wherein the mounting pin means is fixable connected to the second rail means.

17. A fore and aft adjuster arrangement as described in claim 13 further including a roller on the mounting pin second end.

18. A fore and aft adjuster arrangement as described in claim 13 wherein the arrangement is located substantially below a floor level of a vehicle.

19. A fore and aft adjuster arrangement as described in claim 15 further including second locking means to affix the position of the second rail means with respect to the first rail means during extreme loading conditions.

* * * * *